US012551906B2

(12) United States Patent
Hasler et al.

(10) Patent No.: US 12,551,906 B2
(45) Date of Patent: Feb. 17, 2026

(54) DEVICE FOR APPLYING AN APPLICATION AGENT AND COMPRISING A CLEANING ARRANGEMENT FOR DISPENSING A CLEANING FLUID

(71) Applicant: Dürr Systems AG, Bietigheim-Bissingen (DE)

(72) Inventors: Simon Hasler, Bönnigheim (DE); Sebastian Jochum, Ludwigsburg (DE)

( * ) Notice: Subject to any disclaimer, the term of this patent is extended or adjusted under 35 U.S.C. 154(b) by 256 days.

(21) Appl. No.: 18/257,614

(22) PCT Filed: Dec. 9, 2021

(86) PCT No.: PCT/EP2021/084951

§ 371 (c)(1),
(2) Date: Jun. 15, 2023

(87) PCT Pub. No.: WO2022/128727

PCT Pub. Date: Jun. 23, 2022

(65) Prior Publication Data

US 2024/0050962 A1 Feb. 15, 2024

(30) Foreign Application Priority Data

Dec. 18, 2020 (DE) ..................... 10 2020 134 146.6

(51) Int. Cl.
*B05B 1/14* (2006.01)
*B05C 5/02* (2006.01)
(Continued)

(52) U.S. Cl.
CPC .............. *B05B 1/14* (2013.01); *B05C 5/0216* (2013.01); *B08B 5/02* (2013.01); *B05B 1/005* (2013.01);
(Continued)

(58) Field of Classification Search
CPC .. B08B 5/02; B05B 1/14; B05B 1/005; B05C 5/0216; B05C 17/0103; B05C 17/015
See application file for complete search history.

(56) References Cited

U.S. PATENT DOCUMENTS 1,729,759 A * 10/1929 Birkenmaier ......... B05B 7/0815 239/301
1,823,635 A * 9/1931 Williams .................. B05B 1/14 239/558
(Continued)

FOREIGN PATENT DOCUMENTS

CN 2657788 Y 11/2004
CN 104708825 A 6/2015
(Continued)

OTHER PUBLICATIONS

Machine Translation of CN 208865887U to Yin et al., May 2019. (Year: 2019).*
(Continued)

*Primary Examiner* — Benjamin L Osterhout
(74) *Attorney, Agent, or Firm* — Taft Stettinius & Hollister LLP; Thomas E. Bejin; John W. Carpenter

(57) ABSTRACT

The disclosure relates to a device for applying an application agent to a component, comprising at least one application agent opening for dispensing the application agent. The device is characterized in particular in that it comprises at least one cleaning arrangement with cleaning openings for dispensing a cleaning fluid, preferably cleaning air.

20 Claims, 9 Drawing Sheets

(51) Int. Cl.

| | |
|---|---|
| ***B08B 5/02*** | (2006.01) |
| *B05B 1/00* | (2006.01) |
| *B05C 17/01* | (2006.01) |
| *B05C 17/015* | (2006.01) |

(52) U.S. Cl.
CPC ........ *B05C 17/0103* (2013.01); *B05C 17/015* (2013.01)

(56) References Cited

U.S. PATENT DOCUMENTS

| | | | | |
|---|---|---|---|---|
| 4,830,882 | A * | 5/1989 | Ichinose | B05B 15/555 427/427.2 |
| 4,979,677 | A * | 12/1990 | Dankert | B05B 15/74 239/105 |
| 5,183,066 | A * | 2/1993 | Hethcoat | B05B 15/555 134/102.2 |
| 5,947,377 | A | 9/1999 | Hansinger et al. | |
| 6,355,114 | B1 * | 3/2002 | White | B05B 3/027 134/179 |
| 6,418,944 | B1 * | 7/2002 | White | B05B 3/027 134/179 |
| 6,732,751 | B2 * | 5/2004 | Chiang | B05B 15/555 134/103.2 |
| 9,221,068 | B2 * | 12/2015 | Jessup | B08B 3/02 |
| 11,097,301 | B2 * | 8/2021 | Jessup | B05B 15/555 |
| 2009/0197512 | A1 | 8/2009 | Moller et al. | |
| 2010/0269864 | A1 | 10/2010 | Lohrke | |
| 2016/0052012 | A1 | 2/2016 | Mohr | |
| 2016/0121372 | A1 * | 5/2016 | Pfau | B05B 12/04 134/30 |
| 2017/0072421 | A1 | 3/2017 | Baumann et al. | |

FOREIGN PATENT DOCUMENTS

| | | | |
|---|---|---|---|
| CN | 104729249 | A | 6/2015 |
| CN | 104755182 | A | 7/2015 |
| CN | 204620296 | U | 9/2015 |
| CN | 207076623 | U | 3/2018 |
| CN | 108025325 | A | 5/2018 |
| CN | 109643942 | A | 4/2019 |
| CN | 208865887 | U | 5/2019 |
| DE | 69827077 | T2 | 3/2006 |
| DE | 102004058054 | A1 | 6/2006 |
| DE | 102009009244 | A1 | 8/2010 |
| DE | 102012018940 | A1 | 3/2014 |
| DE | 102013003688 | A1 | 4/2014 |
| JP | H0437549 | U | 3/1992 |
| KR | 20110076141 | A | 7/2011 |
| WO | 2006034824 | A2 | 4/2006 |
| WO | 2019063425 | A1 | 4/2019 |

OTHER PUBLICATIONS

European Intellectual Property Office Action for related application No. 21 839 039.1-1009 mailed April 1, 2025—(5 pages; English translation unavailable).
Office Action from German Patent Office for related application No. DE102020134146.6 mailed Jul. 30, 2021 (16 pages; with English machine translation).
International Search Report and Written Opinion for PCT/EP2021/084951 mailed Apr. 21, 2022 (12 pages; with English translation).
Chinese Patent Office Action and Search Report for related application No. 202180085373.1 mailed Jun. 23, 2025 (9 pages, with English translation).
Chinese Patent Office Action and Search Report for related application No. 202180085373.1 dated Dec. 5, 2025 (20 pages; with English/German translation).

* cited by examiner

DEVICE FOR APPLYING AN APPLICATION AGENT AND COMPRISING A CLEANING ARRANGEMENT FOR DISPENSING A CLEANING FLUID

CROSS-REFERENCE TO RELATED APPLICATIONS

This application is a national stage of, and claims priority to, Patent Cooperation Treaty Application No. PCT/EP2021/084951, filed on Dec. 9, 2021, which application claims priority to German Application No. DE 10 2020 134 146.6, filed on Dec. 18, 2020, which applications are hereby incorporated herein by reference in their entireties.

FIELD

The disclosure relates in particular to a device for applying an application agent to a component (e.g. a motor vehicle body component, preferably an underbody for a motor vehicle), comprising at least one cleaning arrangement with several cleaning openings for dispensing a cleaning fluid. The application agent can be, e. g., a polyvinyl chloride (PVC, in particular PVC plastisol), a thick matter, a paint, an adhesive, a sealant, a preservative agent (e.g., wax), and/or an insulating material, etc. The cleaning fluid is preferably air, in particular compressed air.

BACKGROUND

From WO 2019/063425 A1, a device for the application of an application agent to a component is already known. During application of the application agent, it is possible that the application agent is applied to partial sections, such as e. g. holes, bolts, threads, etc. In order to avoid impairment by the application agent, the application agent is then removed again from the partial sections and the partial sections are thus suitably cleaned. For this purpose, in practice, manual cleaning guns are used, for example, by means of which the necessary cleaning process is carried out.

DETAILED DESCRIPTION

Figure 1:
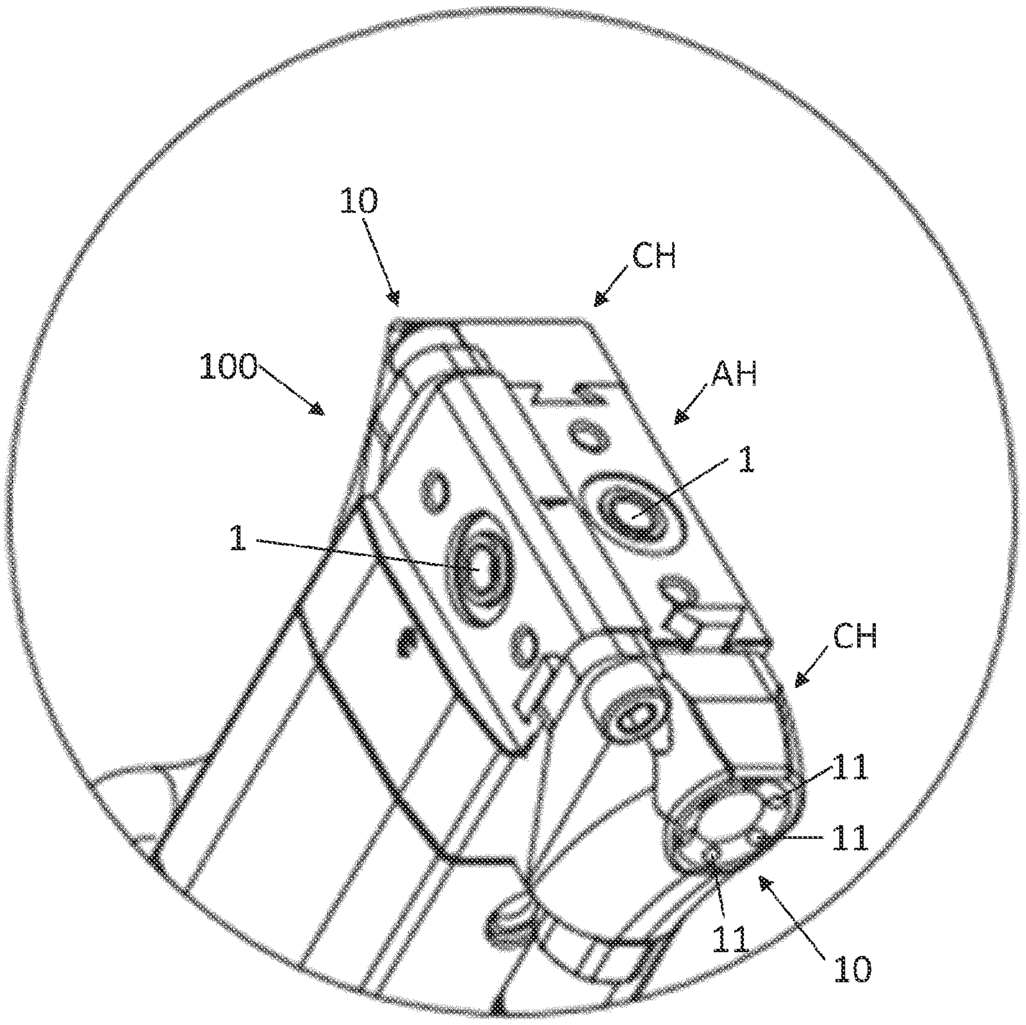
FIG. 1 shows a perspective view of a device according to an exemplary embodiment of the disclosure.

The disclosure creates an alternative and/or improved possibility for in particular automated and/or effective cleaning of partial sections, by means of which it is preferably also possible to apply an application agent.

The disclosure relates to a device for applying an application agent to a component, e.g. a motor vehicle body component.

The application agent can comprise, e. g., a polyvinyl chloride (PVC, in particular a PVC plastisol), a thick matter, a paint, an adhesive, a sealant, a preservative agent (e.g. wax) and/or an insulating material.

The device can comprise, e. g., at least one application agent opening for dispensing the application agent.

The device can comprise in particular at least one cleaning arrangement with cleaning openings for dispensing a cleaning fluid (in particular cleaning air), e.g. in order to expediently clean at least one partial section, in particular from application agent.

The cleaning fluid can preferably be dispensed by means of (e.g. pulsed or non-pulsed) output jets. The output jets in the context of the disclosure can be e.g. continuous output jets (expediently continuous air) and/or in particular short blasts (expediently compressed air blasts).

The cleaning fluid can preferably be dispensed in the form of a substantially laminar flow.

The cleaning fluid can preferably be dispensed onto a partial section to be cleaned, e. g. a partial section to be cleaned of the component.

The device can thus serve, on the one hand, to apply an application agent and, on the other hand, comprise at least one cleaning arrangement with cleaning openings for dispensing a cleaning fluid.

The disclosure enables in particular one or more of the following advantages:

- Compact and/or small device.
- Only small interfering contour.
- Application and cleaning processes are possible simultaneously and thus, e. g., in one work step.
- Reproducible cleaning and/or application results.
- Precise cleaning and/or application results.
- Fast and/or effective cleaning of partial sections.
- Elimination of manual cleaning work.

It is possible that between the cleaning openings at least one elevation is formed, preferably in order to reduce, preferably prevent, developing of an under pressure during the dispensing of the cleaning fluid.

The elevation is preferably formed substantially centrally between the cleaning openings.

It is possible that the elevation is e.g. formed substantially cone-shaped and/or conical, preferably formed substantially pointed-tapered, e.g. with apex in the center between the cleaning openings.

The elevation can, e. g., have an inclination angle of preferably between 135° to 175°.

The elevation is preferably exposed.

The cleaning openings can, e. g., be uniformly distributed around the elevation.

The cleaning openings can e. g., form a preferably substantially circular extending cleaning opening ring, be arranged substantially uniformly distributed (e.g., be uniformly spaced apart from each other) and/or be arranged substantially circularly distributed.

The cleaning arrangement can have, e. g., at least three, at least four, at least five, or at least six cleaning openings.

It is possible that the cleaning openings open expediently outlet-sided into a preferably ring-shaped extending conical output section and/or open into a preferably ring-shaped extending, in particular front-sided recess.

The output section can, e. g., have an inclination angle of, e. g., between 5° and 45°, preferably between 10° and 35°.

The recess can preferably be formed by the conical output section and the elevation.

It is possible that the cleaning arrangement comprises cleaning fluid channels opening into the cleaning openings, so that preferably respectively one cleaning fluid channel can open into respectively one cleaning opening.

The cleaning fluid channels can taper, preferably conically taper, at least in sections on their way to the cleaning openings. This can advantageously enable an increase in the flow velocity, e.g. up to the cleaning openings by at least 3 times. The cleaning fluid channels can, however, also be formed with a substantially constant throughflow cross-section, e. g., but optionally comprise inlet-sided intake funnels described further below.

It is possible that the cleaning fluid channels extend expediently in an arcuate manner at least in sections, preferably without edges in their contour course.

The cleaning fluid channels can be substantially circularly distributed and/or uniformly spaced from each other.

It is possible that the cleaning fluid channels are connected inlet-sided to a common cleaning fluid distributor, via which the cleaning fluid can be distributed to the cleaning fluid channels, preferably substantially uniformly. The cleaning fluid distributor can, e. g., comprise a substantially circular-shaped or circular ring-shaped basic structure.

The cleaning fluid distributor can comprise, e. g., a pressure tank, preferably at its subsection facing away from the cleaning fluid channels.

The cleaning fluid distributor can, e. g., comprise at least one supply via which the cleaning fluid can be supplied to the cleaning fluid distributor, preferably substantially centrally and/or decentrally (e.g., from the side and/or from radially outside).

The cleaning fluid distributor can also comprise e. g. at least two supplies.

It is possible that e. g. one supply opens substantially centrally into the cleaning fluid distributor and/or one supply opens decentrally into the cleaning fluid distributor, in particular from the side and/or radially outside.

It is possible that at the outlet-sided last third of the cleaning fluid channels an approximately equal pressure distribution can be ensured despite decentralized, in particular lateral, cleaning fluid supply.

It is possible that the cleaning fluid channels have inlet-sided e. g. arched and/or inclined intake funnels for inserting the cleaning fluid and e. g. the intake funnels are connected to the cleaning fluid distributor. The intake funnels can be configured, e. g., to enable an advantageously flow-optimized insertion of the cleaning fluid into the cleaning fluid channels. The lateral surface of the intake funnels can be e. g. convex inside.

The intake funnels can preferably be formed without edges in their contour course.

It is possible that the cleaning openings and/or the cleaning fluid channels are aligned inwardly, e.g. such that their output jets and/or their central axes approach each other towards the output side. Alternatively or additionally, the cleaning openings and/or the cleaning fluid channels can be aligned, e. g. such that their output jets and/or their central axes can in particular focus substantially centrally, preferably can cross and/or bundle. Thereby, for example, a bundled core jet downstream of the cleaning openings can be made possible.

It is possible that the at least one application agent opening is formed in an application head and/or the at least one cleaning arrangement is part of at least one cleaning head.

The at least one cleaning head is preferably detachable and e.g. attachable laterally outside to the application head.

The at least one cleaning head can, e.g., be slidable or pluggable to the application head preferably by means of an e. g. rail-shaped (e. g. a dovetail guide) guide assembly. Alternatively or additionally, the at least one cleaning head can be releasably fixed to the application head by means of a fastening means (e.g., a screw connection, e.g., a bolt-hole combination or screw-hole combination).

It is possible that a lance is provided.

It is possible that at the particularly distal end of the lance the application head and/or the at least one cleaning head is arranged.

The lance can be configured, e. g., for mounting on a fully automated machine, in particular a multi-axis robot. The lance can, e. g. inside and/or outside, comprise at least one line for supplying application agent to the at least one application agent opening.

There can be provided, e. g., at least one preferably pneumatic spiral feed line (e.g. double spiral feed line) by means of which the cleaning fluid can be fed to the at least one cleaning arrangement. The at least one spiral feed line can extend in particular outside spirally around the lance and/or be formed as a spiral hose (e.g. pneumatic spiral hose) and preferably lie closely on the lance.

The spiral feed line preferably does not create a significant interference contour.

The at least one spiral feed line can outlet-sided open, preferably directly or indirectly, into the at least one cleaning head, in particular into the cleaning fluid distributor.

The at least one spiral feed line is preferably routed and/or configured such that the application head and/or the at least one cleaning head can rotate by preferably plus/minus at least 360°, preferably without impairing the application process and/or cleaning process.

The device can comprise, e.g., at least two or at least three application agent openings preferably aligned different directions (e.g. 0°, 45° and/or 90° or other suitable alignment angles).

There can be provided at least two cleaning arrangements as disclosed herein and thus preferably at least two cleaning heads as disclosed herein.

At least, e. g., two cleaning arrangements aligned in different directions can be provided (e.g., 0°, 45° and/or 90° or other suitable alignment angles).

The shape of the cleaning openings and/or the cleaning fluid channels can be, e. g., substantially circular and/or elongated.

The diameter of the cleaning openings can e. g. be smaller than 4 mm or smaller than 3 mm.

It is possible that the cleaning opening ring, the recess and/or the output section is substantially ring-shaped, in particular circular ring-shaped. Alternatively or additionally, the cleaning opening ring, the elevation, the recess and/or the output section can, e. g., be arranged substantially coaxially (e.g. concentrically). In this way, e. g., a coaxially (e.g. concentrically) formed cleaning arrangement can be produced.

The partial section to be cleaned can comprise, e. g., a preferably threaded hole (e.g., through-hole or blind hole) and/or a preferably threaded bolt.

It should be mentioned that the at least one cleaning arrangement can be used in particular to clean partial sections on underbodies for motor vehicles, such as in particular holes (e.g. 5 mm in size) and/or threaded bolts (e.g. 15 mm long), in particular from application agent. The cleaning can take place, e. g., during and/or after an application of the application agent (e.g. PVC).

It should also be mentioned that the at least one cleaning arrangement can be used, e. g., to remove application agent dispensed by means of the at least one application agent opening. The partial section to be cleaned can be, e. g., a partial section of the component or a partial section of another component.

It should also be mentioned again that the cleaning fluid is preferably cleaning air.

The cleaning fluid can be dispensed, e. g., onto the component or onto another component.

The at least one cleaning arrangement, in particular the cleaning fluid, can expediently be used to clean the component or another component. The application agent to be removed can be application agent that has been dispensed, e. g., from the at least one application agent opening disclosed herein and/or that has been dispensed, e. g., from another, separate applicator.

The device can, e. g., comprise a mounting means for mounting on a fully automated machine, in particular a multi-axis robot, e.g. jointed-arm robot. Alternatively, however, it can also comprise, e. g, a handle for manual use.

The activation and deactivation of the dispensing of the cleaning fluid can, e. g., be freely programmable and/or fully automatically controllable, preferably by means of a movement program of a robot carrying the device. Alternatively, however, the at least one cleaning arrangement can also be used manually with a hand applicator.

The disclosure also relates to a cleaning arrangement as disclosed herein, particularly to a cleaning head having a cleaning arrangement as disclosed herein.

Thus, the disclosure also claims independent protection for the subject matter and the features of the cleaning arrangement as disclosed herein.

The disclosure also relates to an operating method for a device for applying an application agent to a component, preferably for a device as disclosed herein. In the operating method, the application agent is dispensed from at least one application agent opening, wherein at least one cleaning arrangement comprises cleaning openings from which a cleaning fluid is dispensed, in particular to clean a partial section to be cleaned.

The disclosure therefore claims in particular an independent protection for the subject matter and the features of a device, a cleaning arrangement and an operating method.

The cleaning fluid can, e. g., be dispensed temporally after the application agent. Alternatively or additionally, the cleaning fluid and the application agent can be dispensed, e. g., simultaneously.

It is possible that the at least one cleaning arrangement is expediently positioned spaced in front of a partial section to be cleaned, preferably positioned substantially coaxially, e.g. such that the elevation and/or the cleaning opening ring is substantially coaxially aligned with the partial section to be cleaned. The partial section is preferably a partial section of the component.

It is possible that the cleaning fluid for substantially complete cleaning of the partial section to be cleaned is dispensed for only a maximum of 3 seconds, a maximum of 2 seconds, a maximum of 1.5 seconds or a maximum of 1 second, e.g. in the form of a short compressed air stream. Preferably directly thereafter, the at least one cleaning arrangement can e. g. be moved away from the cleaned partial section.

The cleaning fluid can, e. g., be dispensed while the at least one cleaning arrangement stands still and thus remains static, in particular relative to the partial section to be cleaned. Alternatively or additionally, the partial section to be cleaned can be cleaned substantially completely, e.g. in its circumferential direction and/or in its axial direction, preferably without the at least one cleaning arrangement performing a rotational movement for cleaning purposes relative to the partial section to be cleaned.

The cleaning fluid can in particular be used to clean the partial section to be cleaned from application agent dispensed by means of the at least one application agent opening.

The previously described preferred exemplary embodiments and features of the disclosure can be expediently combined with each other.

The preferred exemplary embodiments of the disclosure described with reference to the figures coincide in part, wherein similar or identical parts are indicated by the same reference signs, and reference can also be made to the description of the other exemplary embodiments for their explanation in order to avoid repetitions.

Figure 2:
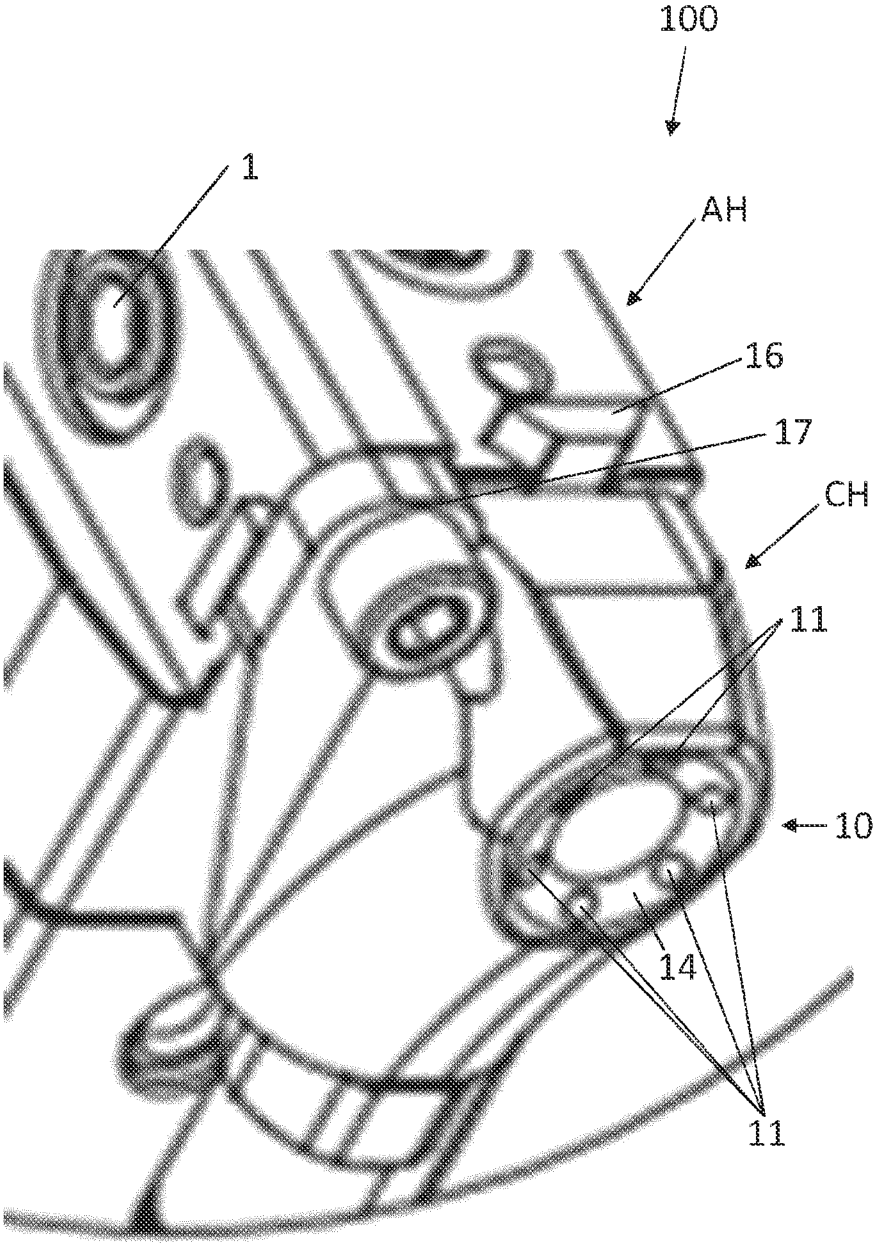
FIG. 2 shows an enlarged detailed view of FIG. 1, in particular of a cleaning arrangement according to an exemplary embodiment of the disclosure.
Figure 3:
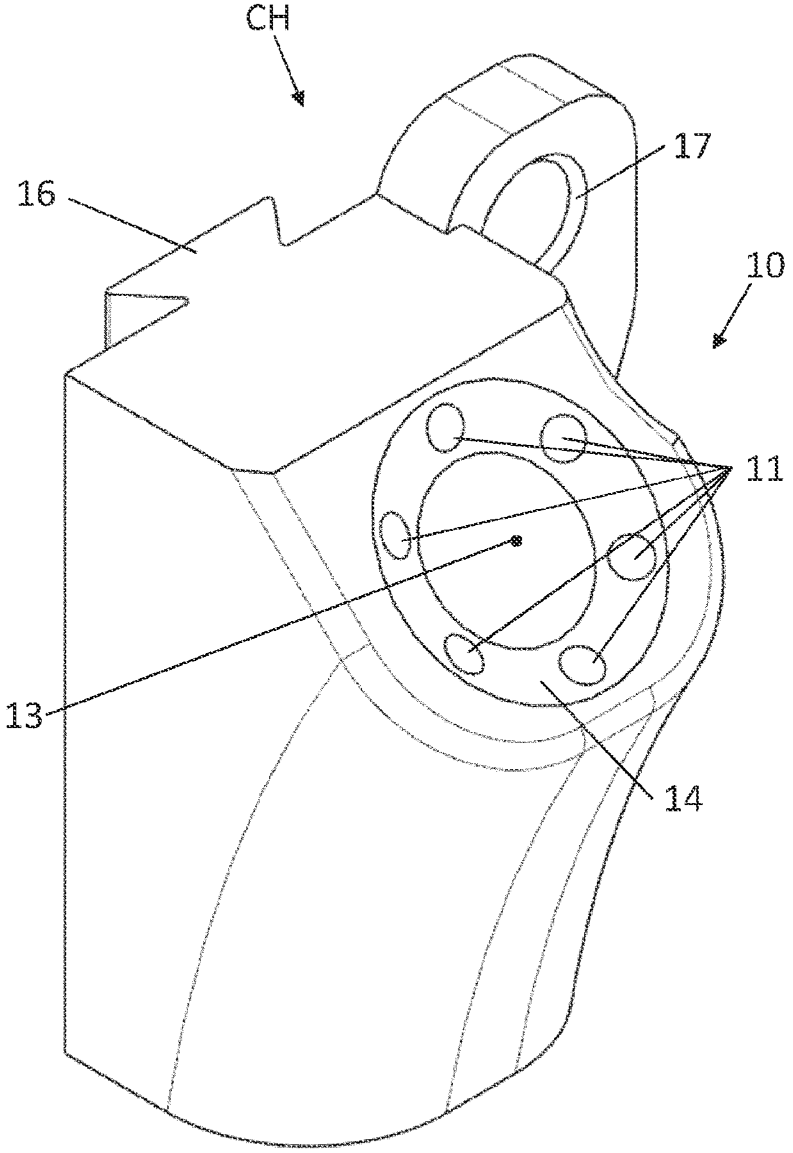
FIG. 3 shows a perspective view of the cleaning arrangement of FIGS. 1 and 2.
Figure 4:
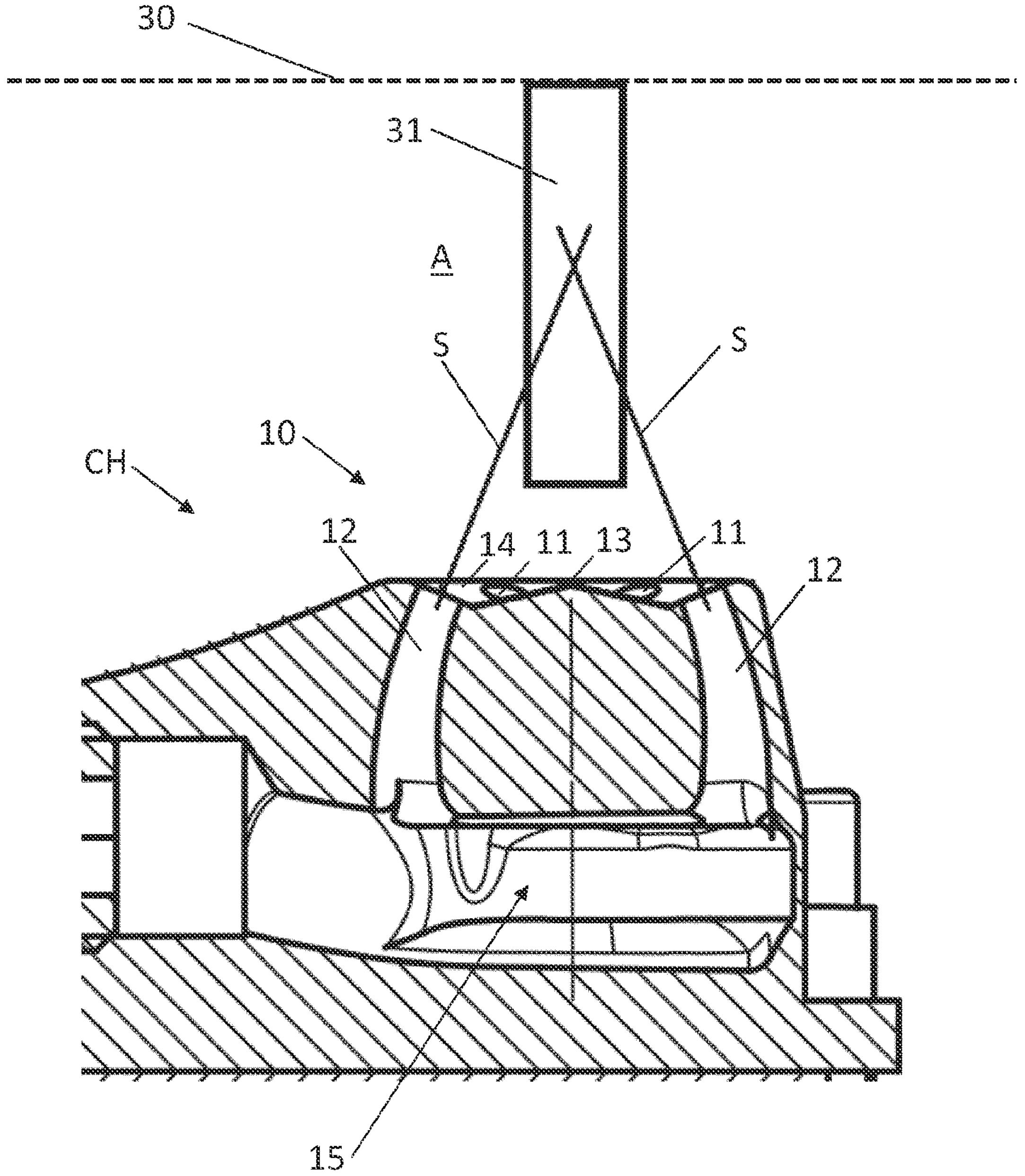
FIG. 4 shows a sectional view of the cleaning arrangement of FIGS. 1 to 3.
Figure 5:
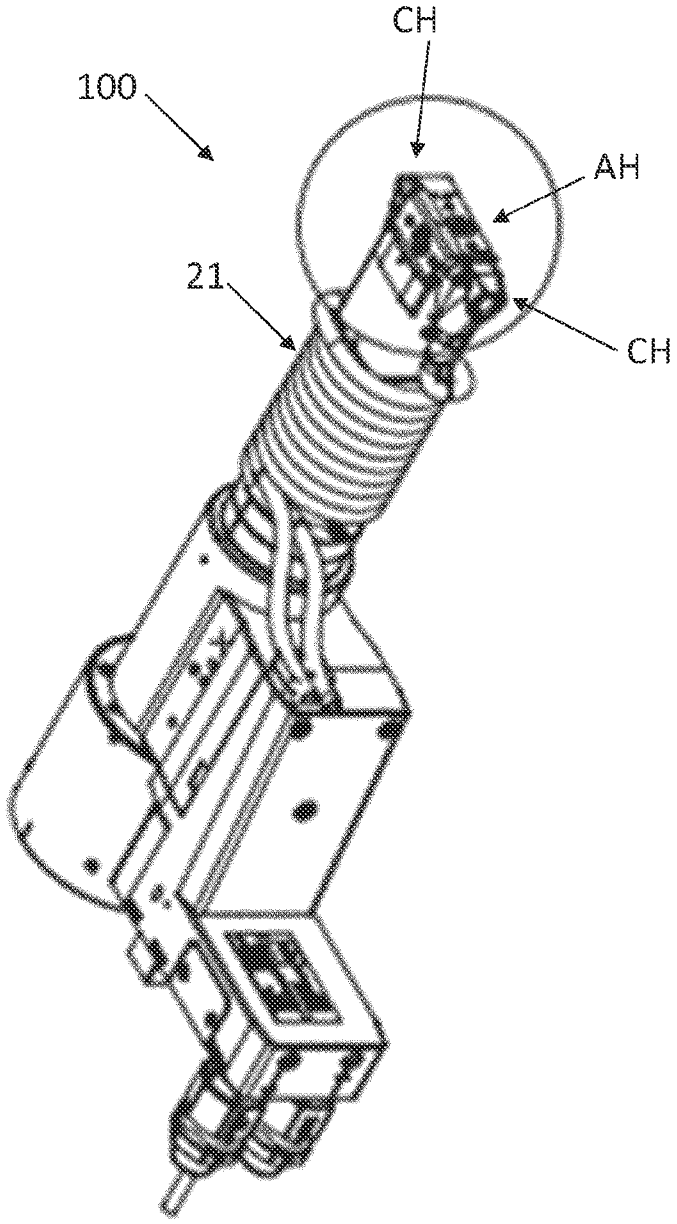
FIG. 5 shows a perspective view of a device according to an exemplary embodiment of the disclosure.
Figure 6:
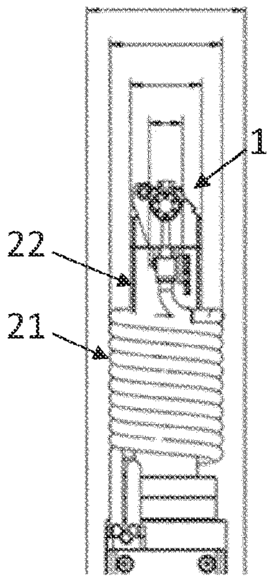
FIGS. 6 to 10 show different views of the device of FIG. 5, FIGS. 11 and 12 show different views in particular of a cleaning fluid distributor and of cleaning fluid channels opening into cleaning openings.
Figure 7:
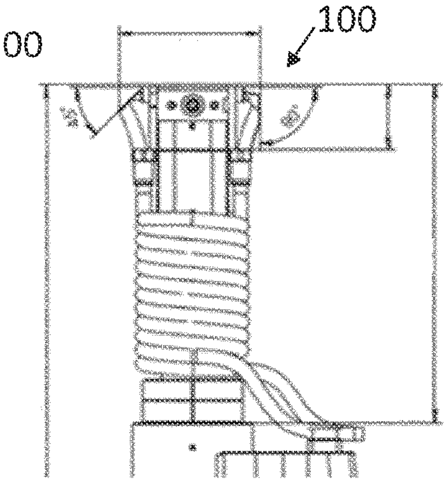
Figure 8:
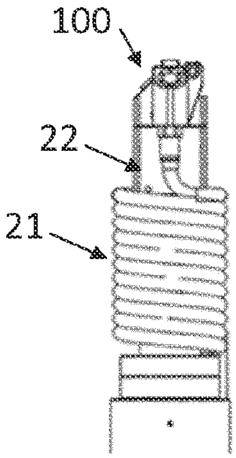
Figure 9:
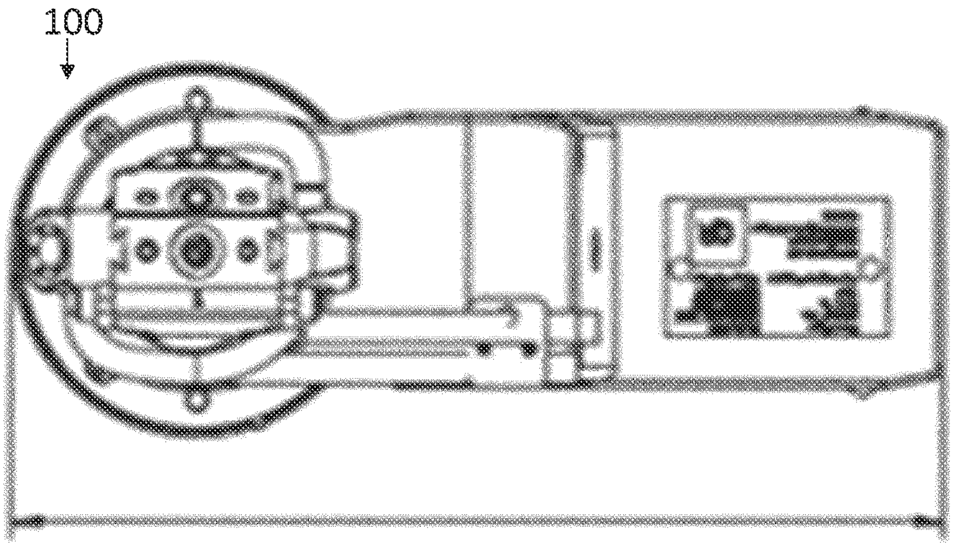
Figure 10:
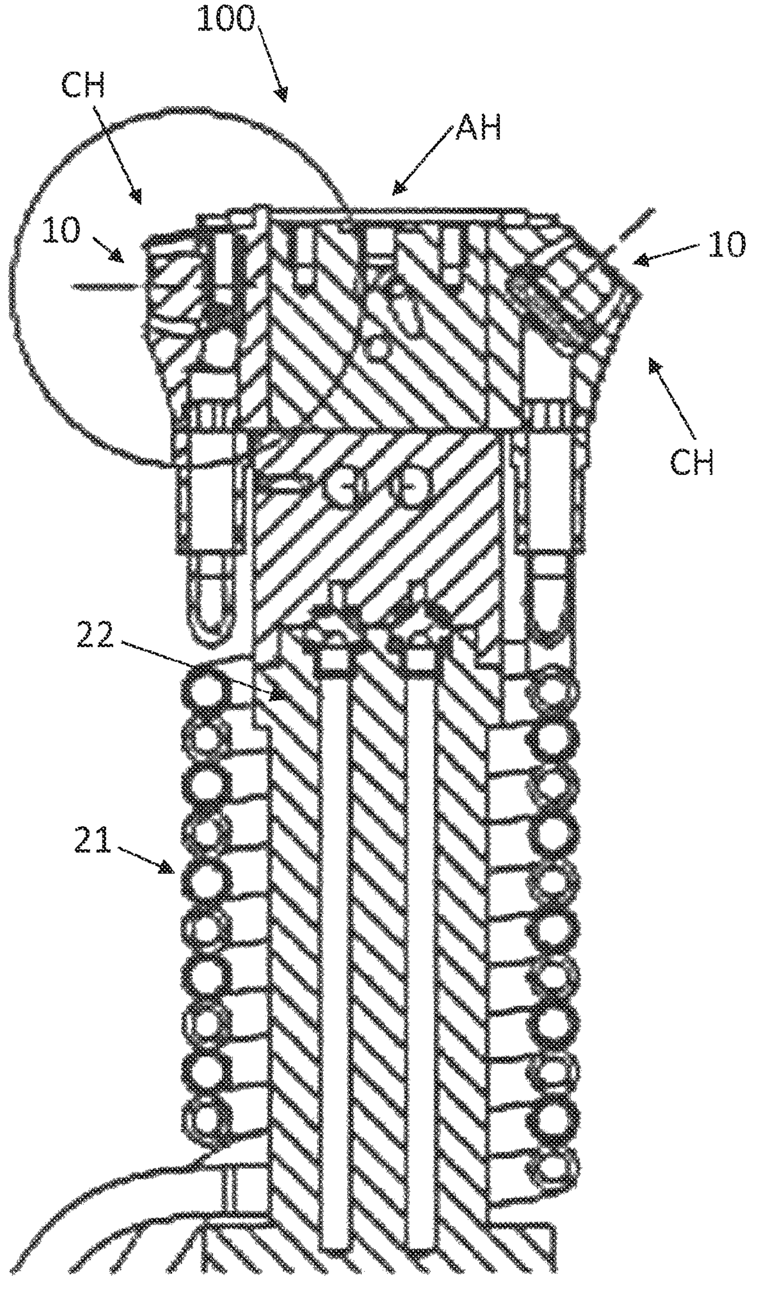

FIG. 1 shows a perspective view of a device 100 according to an exemplary embodiment of the disclosure, wherein FIG. 2 shows an enlarged detailed view of FIG. 1. FIG. 3 shows a perspective view of the cleaning arrangement 10 of FIGS. 1 and 2, wherein FIG. 4 shows a sectional view of the cleaning arrangement 10 of FIGS. 1 to 3.

The device 100 serves for applying an application agent, in particular a thick matter and/or a sealing agent such as e. g. polyvinyl chloride (PVC), to a component 30 such as e. g. a motor vehicle body component. The device 100 comprises preferably three application agent openings 1, aligned in different directions (e.g., 0°, 45°, and 90°), for dispensing the application agent, although only two application agent openings 1 are visible in FIG. 1. The application agent openings 1 are part of an application head AH.

The device 100 further comprises preferably two cleaning arrangements 10, which are formed as part of two cleaning heads CH. The cleaning heads CH, and thus the cleaning arrangements 10, are preferably detachably attached to different sides of the application head AH. The two cleaning arrangements 10 are preferably aligned in different directions. With the exception of the different alignment, however, the cleaning arrangements 10 and the cleaning heads CH can be of substantially identical construction, so that only one cleaning arrangement 10 together with the associated cleaning head CH is described below.

Cleaning is understood in particular as the removal and/or displacement of application agent, which is located on a partial section 31 to be cleaned and/or around a partial section 31 to be cleaned and which can impair the function of the partial section 31 or generally should not be there. The application agent to be removed can, e. g., be application agent that has been dispensed from one of the application agent openings 1 or has been dispensed from another separate applicator.

The cleaning arrangement 10 comprises preferably six cleaning openings 11 for dispensing a cleaning fluid, preferably for dispensing cleaning air. The cleaning fluid can be dispensed in the form of output jets S shown schematically in FIG. 4, which can expediently be continuous, pulsed, long, short and/or blast-like. The cleaning openings 11 are arranged circularly distributed and form a particularly circular ring-shaped cleaning opening ring.

Figure 11:
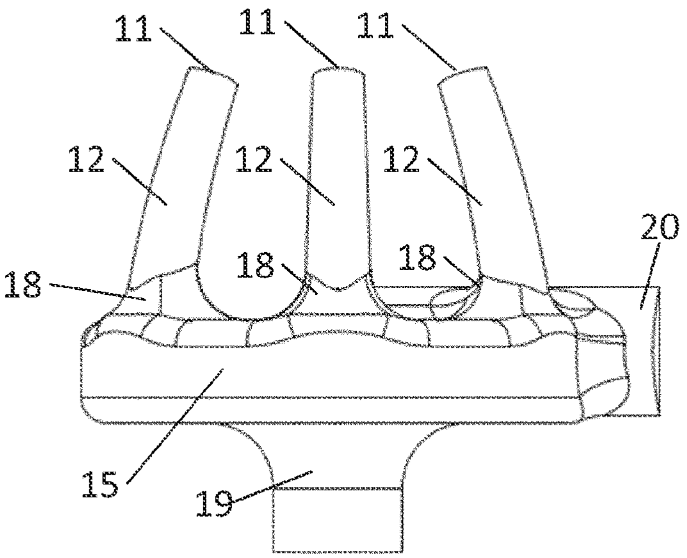
Figure 12:
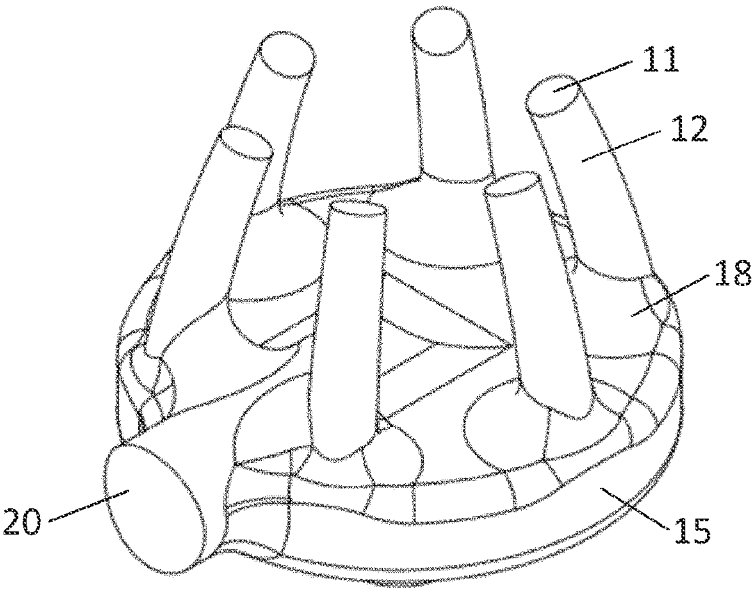

Six cleaning fluid channels 12 opening into the cleaning openings 11 are provided, so that respectively one cleaning fluid channel 12 can open into respectively one cleaning opening 11 (e.g., FIGS. 11 and 12). The cleaning fluid channels 12 are formed in an arcuate shape and can preferably taper conically towards the cleaning openings 11.

Preferably centrally between the cleaning openings 11, at least one, in particular cone-shaped and/or conical, elevation 13 is formed, preferably to prevent a developing of an under pressure during the dispensing of the cleaning fluid, in particular to enable a substantially uniform pressure level in the region of the cleaning openings 11. This can advantageously prevent unintentional contamination between the cleaning openings 11. It should be noted that the cone-shaped and/or conical elevation 13 cannot be seen directly in the perspective views of FIGS. 1 to 3, because it has no contours. The cleaning openings 11 are arranged circularly distributed around the elevation 13.

The cleaning openings 11 open outlet-sided into a ring-shaped extending conical output section 14 and, in particular, into a front-sided recess, which can be delimited on the one hand by the output section 14 and on the other hand by the elevation 13.

The cleaning opening ring, the elevation 13, the recess and the output section 14 are preferably arranged coaxially to enable an in particular coaxially formed cleaning arrangement 10.

Inlet-sided, the cleaning fluid channels 12 are connected to a common cleaning fluid distributor 15, via which the cleaning fluid can be distributed to the cleaning fluid channels 12, preferably substantially uniformly.

The cleaning openings 11 and/or the cleaning fluid channels 12 are aligned inwardly, so that their central axes and thus their output jets S approach each other towards the output side A, e.g., so that they can focus, preferably cross and/or bundle, substantially centrally.

The cleaning head CH is preferably slidable or pluggable to the application head AH by means of a rail-shaped guide assembly (e.g., dovetail guide) 16 and is detachably fixable to the application head AH by means of a fastening means (e.g., a screw connection) 17.

The cleaning heads CH with the cleaning arrangements 10 are arranged laterally outside on the application head AH, so that the cleaning heads CH and the application head AH do not impair each other during their operation.

FIG. 4 also illustrates why and how a partial section 31 can be advantageously cleaned by means of the cleaning arrangement 10.

One or more of the application agent openings 1 are initially used to apply the application agent as desired to the component 30 shown only schematically in FIG. 4. Here, however, it may happen that the application agent also reaches the partial section 31 and can thus impair the function of the partial section 31. The partial section 31 can, e. g., be a threaded round bolt.

The cleaning arrangement 10 can be used to remove and/or displace the application agent from the partial section 31, to thus expediently clean the partial section 31.

For this, the cleaning arrangement 10 can initially be positioned axially spaced and, in particular, coaxially in front of the partial section 31, so that the elevation 13 and/or the cleaning opening ring is substantially aligned coaxially with the partial section 31. Thereupon, the cleaning fluid can be dispensed, with a preferably standstill, static cleaning arrangement 10.

FIG. 4 illustrates that the partial section 31 can be cleaned substantially completely in its circumferential direction and preferably in its axial direction by means of the circular ring-shaped cleaning opening ring formed by the cleaning openings 11, without the cleaning arrangement 10 needing to perform a rotational movement relative to the partial section 31 for cleaning purposes. Depending on the boundary conditions, cleaning fluid can, e. g., be dispensed temporally after the application agent or dispensed simultaneously with the application agent.

The centric elevation 13 in the middle of the cleaning openings 11 can, in particular, prevent an under pressure in the middle of the outflowing output jets S. Thus, no medium is drawn into the middle and the partial section 31 can be blown off cleanly at its tip. If the in particular cone-shaped and/or conical elevation 13 is e. g. omitted, the partial section 31 would not be clean at its tip because an under pressure would form shortly downstream of the cleaning openings 11 and thus the cleaning fluid would be drawn into the center.

With the cleaning arrangement 10, it is possible in particular to clean round threaded bolts completely around from their tip to their end, namely preferably in just one work step. The thread of the threaded bolt can also be cleaned internally in the thread flanks. For this, the cleaning arrangement 10 does not have to be moved. The cleaning arrangement 10 can merely be positioned at a small distance to the threaded bolt and be charged with a short blast of, e. g., approx. 0.5 to 1 second with the cleaning fluid, in particular compressed air. An additional cleaning effect on the component 30, e.g. a flat surface on which the threaded bolt is mounted, is another advantage that can be achieved with the cleaning arrangement 10.

FIGS. 5 to 10 show different views of a device 100 according to an exemplary embodiment of the disclosure.

A lance 22 is provided, at the particularly distal end whereof the application head AH and at least one cleaning head CH is arranged. The device 100 also comprises at least one spiral feed line 21, which extends outside spirally around the lance 22. By means of the spiral feed line 21, the cleaning fluid can be fed to the cleaning arrangement 10, in particular without creating a substantial interference contour for this purpose.

The spiral feed line 21 can expediently open indirectly or directly, e. g., into the cleaning fluid distributor 15.

The device 100 can also preferably comprise a mounting means by means of which the lance 22 can be mounted to a multi-axis robot, preferably a jointed-arm robot.

FIGS. 11 and 12 show different views, in particular, of cleaning fluid channels 12 opening into cleaning openings 11. Respectively one cleaning fluid channel 12 can open into respectively one cleaning opening 11.

The cleaning fluid channels 12 are connected inlet-sided to a common, preferably circular-shaped or circular ring-shaped, cleaning fluid distributor 15, via which the cleaning fluid can be distributed to the cleaning fluid channels 12. The cleaning fluid distributor 15 preferably comprises at least two supplies 19 and 20, via which the cleaning fluid can be delivered to the cleaning fluid distributor 15. The supply 19 forms a central supply, wherein the supply 20 forms a decentralized supply.

The cleaning fluid channels 12 respectively comprise inlet-sided a preferably arched intake funnel 18 for inserting the cleaning fluid, wherein the intake funnels 18 can expediently connect to the cleaning fluid distributor 15.

The optional cleaning fluid distributor 15 can be configured, e. g., to provide a required volume flow of cleaning fluid (e.g. air), with preferably low pressure loss to the at least one supply 19 and/or 20, and to enable a uniform distribution of the cleaning fluid mass to the individual cleaning fluid channels 12.

Figure 13:
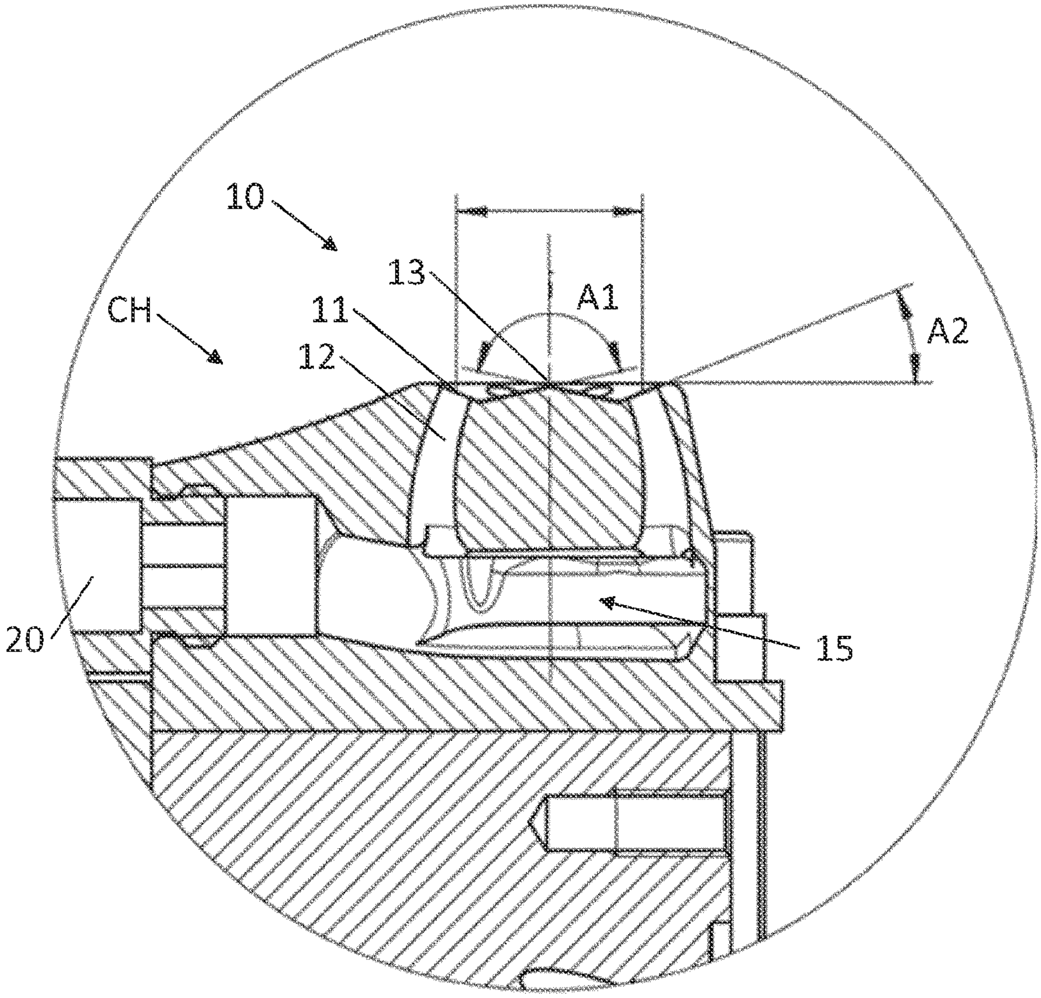
FIG. 13 shows a sectional view of a cleaning arrangement according to an exemplary embodiment of the disclosure.

FIG. 13 shows a sectional view of a cleaning head CH with a cleaning arrangement 10 according to an exemplary embodiment of the disclosure.

FIG. 13 shows in particular a cone-shaped and/or conically formed elevation 13 with an inclination angle A1 of, e. g., between 135° to 175°, in particular approximately 155°.

FIG. 13 shows in particular a cone-shaped and/or conically formed output section 14 with an inclination angle A2 of, e. g., 10° to 35°, in particular approximately 22°.

The disclosure is not limited to the preferred exemplary embodiments described above. Rather, a large number of variants and modifications are possible which also make use of the concept of the disclosure and therefore fall within the scope of protection. In particular, the disclosure claims independent protection for the subject matter and the features of a device, a cleaning arrangement and an operating method.

The invention claimed is:

1. A device for applying an application agent to a component, comprising:

at least one application agent opening for dispensing the application agent, comprising at least one cleaning arrangement with cleaning openings, characterized in that between the cleaning openings a conical elevation is centrally formed to reduce developing of an under pressure during the dispensing of a cleaning fluid.

2. The device according to claim 1, characterized in that the at least one cleaning arrangement comprises at least five cleaning openings, and the cleaning openings form a cleaning opening ring.

3. The device according to claim 1, characterized in that the cleaning openings are arranged circularly distributed and are uniformly distributed.

4. The device according to claim 1, characterized in that the cleaning openings open into a conical output section.

5. The device according to claim 4 characterized in that the cleaning arrangement comprises cleaning fluid channels opening into the cleaning openings.

6. The device according to claim 5, characterized in that the cleaning fluid channels taper towards the cleaning openings.

7. The device according to claim 5 characterized in that the cleaning fluid channels extend in an arcuate manner.

8. The device according to claim 5 characterized in that the cleaning fluid channels are connected inlet-sided to a common cleaning fluid distributor, via which the cleaning fluid is distributable to the cleaning fluid channels.

9. The device according to claim 8, characterized in that the cleaning fluid distributor comprises one or more supplies via which the cleaning fluid distributor can be supplied with the cleaning fluid.

10. The device according to claim 5 characterized in that the cleaning fluid channels comprise inlet-sided intake funnels for inserting the cleaning fluid, and the intake funnels connect to the cleaning fluid distributor.

11. The device according to claim 10, characterized in that the intake funnels are configured as inclined and/or arched intake funnels.

12. The device according to claim 1, characterized in that the cleaning openings each have a central axis and are inwardly aligned so that their central axes approach each other towards the output side.

13. The device according to claim 1 characterized in that the at least one application agent opening is formed in an application head and/or the at least one cleaning arrangement is part of at least one cleaning head.

14. The device according to claim 13 characterized in that the at least one cleaning head is detachably mountable to the application head.

15. The device according to claim 13, characterized in that the at least one cleaning head is slidable or pluggable to the application head, preferably by means of a guide assembly, and/or is releasably fixable to the application head by means of a fastening means.

16. The device according to claim 1, characterized by at least one spiral feed line, by means of which the cleaning fluid can be fed to the at least one cleaning arrangement.

17. The device according to claim 16, characterized by a lance, wherein the at least one spiral feed line extends spirally around the lance.

18. The device according to claim 17, characterized in that the application head and/or the at least one cleaning head is arranged at the end of the lance.

19. The device according to claim 1, characterized by at least two aligned application agent openings.

20. The device according to claim 2, characterized in that the cleaning opening ring and the elevation are arranged coaxially.

* * * * *